Aug. 2, 1932. J. A. WORDEN 1,869,449
FLUID CLUTCH
Filed June 11, 1929 2 Sheets-Sheet 1

Inventor
James A. Worden
By [signature]
Attorneys

Aug. 2, 1932. J. A. WORDEN 1,869,449
FLUID CLUTCH
Filed June 11, 1929 2 Sheets-Sheet 2

Inventor
James A. Worden
By [signature]
Attorneys

Patented Aug. 2, 1932

1,869,449

UNITED STATES PATENT OFFICE

JAMES A. WORDEN, OF ANTIGO, WISCONSIN, ASSIGNOR OF ONE-HALF TO A. M. OLESTON, OF ANTIGO, WISCONSIN

FLUID CLUTCH

Application filed June 11, 1929. Serial No. 369,941.

This invention relates to new and useful improvements in fluid clutches.

One of the objects of my invention is the provision of an improved type of fluid clutch adapted to provide a positive driving connection between the motor and the transmission and is so constructed and arranged as to eliminate the usual jerking or jarring movement occurring during the connection between the transmission and the drive shaft which usually occurs with the different types of clutches in use at the present time.

Another object of my invention is the provision of a fluid clutch wherein the operating pistons and cylinders are provided with means for stopping the circulation of fluid in the cylinders upon release of the clutch pedal incident to the shifting of gears so as to gradually bring about the operative connection between the motor and the transmission or driving mechanism, so as to reduce to a minimum and practically eliminate the shock or quick jerking movement usually accompanying this operation.

Another object of my invention is the provision of a novel type of operating mechanism for the relief valve whereby the valve is automatically opened and closed when the clutch pedal is operated preliminary to shifting the gears of the transmission so that a positive connection and disconnection between the engine shaft and driven shaft is effected.

A further object is the provision of a novel type of valve to prevent a vacuum in front of the pistons should a leakage occur around the pistons when the motor and driven shaft are operatively connected.

A still further object of my invention is the provision of a fluid clutch adapted to form positive driving connection between the motor shaft and the transmission or driven shaft wherein the operative parts thereof are enclosed in a suitable housing containing a lubricating fluid whereby the parts operate within this fluid so as to maintain them in a constantly lubricated condition to assure the positive operation of the parts when the transmission is operated at any ratio of speed and to positively effect the proper connection between the motor shaft and the drive shaft.

With the above and other objects in view, the invention consists in the novel features of construction, the combination and arrangement of parts hereinafter more fully set forth, pointed out in the claim and shown in the accompanying drawings wherein:

Figure 1:
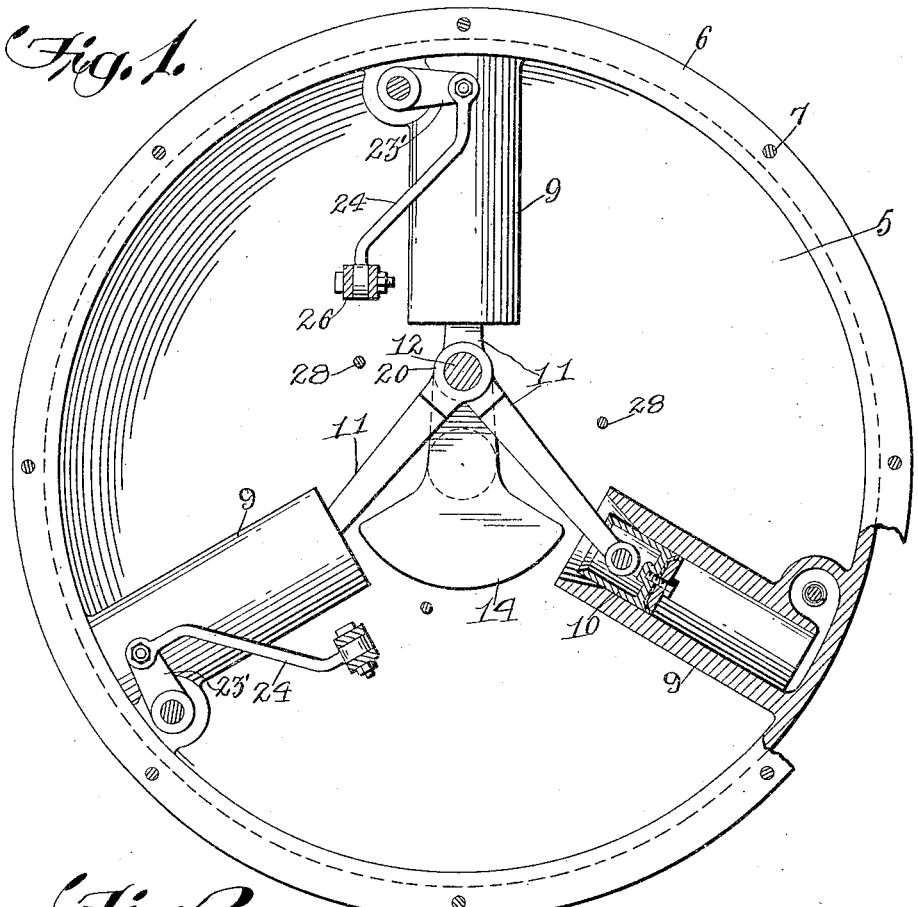
Figure 1 is a side elevation with one section of the casing removed and parts thereof broken away and illustrated in section.
Figure 2:
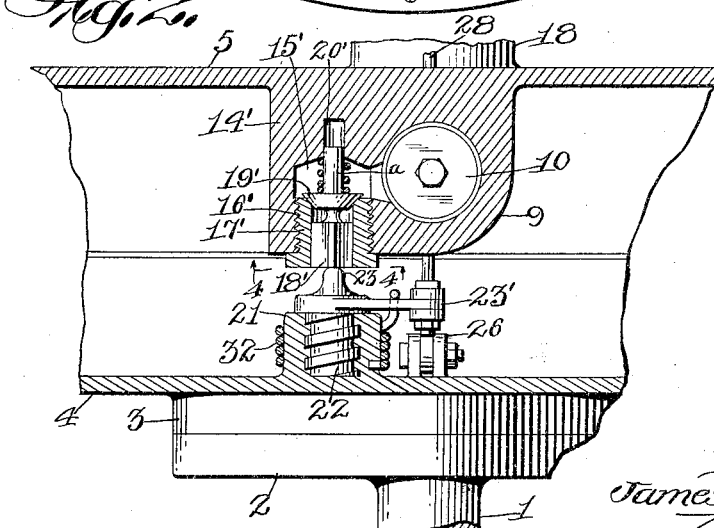
Figure 2 is a detail transverse section illustrating my improved control valve.

Referring now more particularly to the drawings, 1 indicates the motor shaft, the end of which is provided with an annular flange 2, bolted or otherwise secured to a raised disc-like part 3 on the section 4 of the main housing for the operative parts. The housing or casing which contains the operative parts of the device comprises two sections 4 and 5 and the housing or casing being connected to power shaft 1 is rotated therewith. The two sections of the housing are connected by forming the flanges 6 on the edges of the sections and connecting these flanges by suitable bolts 7 with a packing ring 8, arranged between the flanges.

Arranged within the section 5 of the housing are a plurality of radially disposed cylinders 9 in which operate the pistons 10 connected by means of the piston rods 11 to the crank pin 12 carried by the spaced crank arms 13 and 13'. These arms 13 and 13' are arranged in spaced relation with the crank pin 12, extending transversely of the discs at one side thereof. The arms 13 and 13' opposite the crank pin 12 are weighted to form a counter-balance, as shown at 14. The arm 13 is provided with a stub shaft 15 mounted within a suitable bearing 16 carried by the section 4 of the housing.

Figure 3:
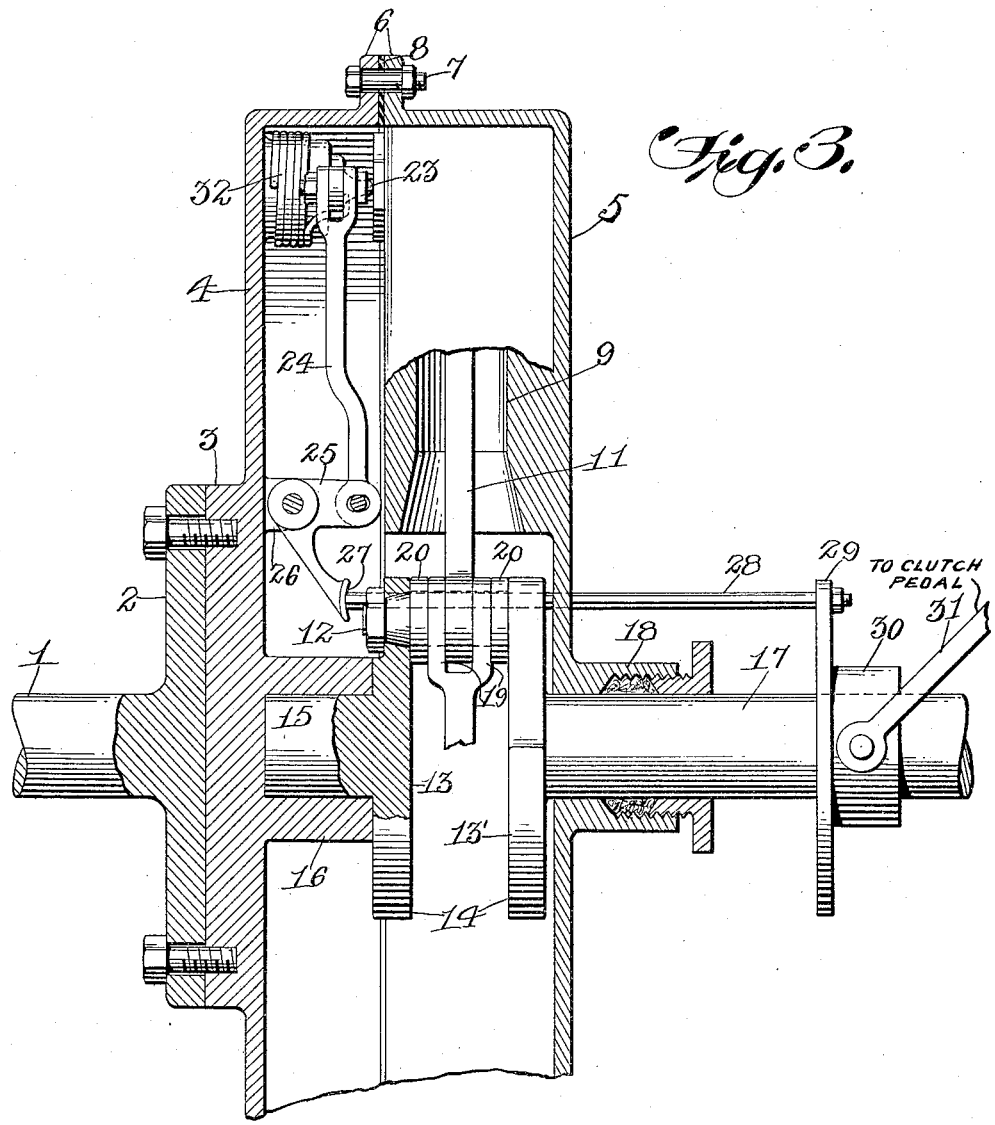
Figure 3 is a detail section through the casing with parts thereof illustrated in elevation; and, Figure 4 is a detail section on the line 4—4 of Figure 2.
Figure 4:
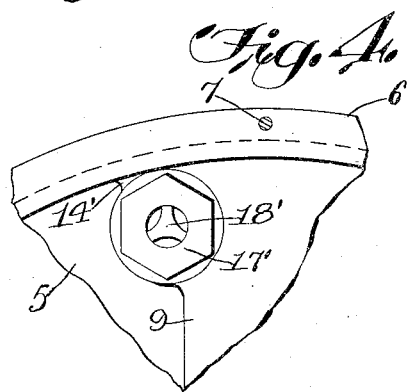

The arm 13' is operatively connected with the forward end of the transmission or driven shaft 17. The shaft 17 is mounted within a suitable bushing 18, which may be formed integral with the section 5 of the housing. In arranging the inner ends of the piston rods 11 on crank pin 12, one of the piston rods is formed with a single aperture mounted preferably on the central portion of the pin, while the next piston rod in order is forked to provide the spaced ears 19 formed with apertures to receive the pin 12 and arranged upon opposite sides of the apertured end of the first piston. The remaining piston is also forked at its inner end, with the forked ends 20 mounted on the pin 12 upon the outer side of the ears 19, whereby all of the piston rods can be connected to crank pin 12 and operate simultaneously, but due to the eccentric position of pin 12 with respect to arms 13 and 13', it will be noted that when one of the pistons is at the limit of its outermost stroke, as shown in Figure 3, the other pistons are approximately positioned at two-thirds of the way on their inner stroke and this operation takes place when the housing is rotating with the power shaft 1.

At the outer end of each cylinder, I provide a lateral extension 14', forming a chamber 15' having an internally threaded outlet 16'. In the outlet 16' is threaded a sleeve 17' having a valve seat upon its inner end, and a flange at its outer end to engage the outer surface of the extension.

Rotatably mounted in the sleeve 17' is a valve rod formed with an enlarged fluted portion 18' providing a normally contacting bearing with the interior of the sleeve and at the same time permitting the passage of fluid through the sleeve. On the valve rod is a valve member 19', adapted to be seated on the valve seat at the inner end of the sleeve 17'. The projecting stem "a" of the valve extends into a bore 20' in the body of the extension 14' and adjusted between the valve member 19' and one wall of the chamber 15' is a coil spring mounted on the valve stem for normally urging the valve to a seated position.

Extending inwardly from the side wall of the section 4 of the housing at a point directly opposite the extension 14' is an internally threaded nipple 21. The nipple is arranged directly opposite each extension for each cylinder and rotatably mounted therein is a screw member 22 having a rounded engaging head 23, bearing against the outer end of the fluted valve rod 18'. Carried by each screw member is a crank arm 23' and connected to the outer end of the crank arm is a rod 24, the inner end of which is loosely connected to the bell crank 25.

The bell crank 25 is pivotally mounted upon spaced ears 26 carried by the section 4 of the housing, and the other arm of the bell crank is provided with a substantially arcuate face 27 adapted to be engaged by one end of a slidable rod 28. The rod 28 is slidably mounted in section 5 of the housing and has its end opposite the end which engages the face 27 connected to a flange 29 on collar 30 which is slidably mounted upon the driven shaft 17 and connected to the clutch pedal by rod 31.

In the operation of my improved device, it will be noted that as the power shaft 1 is being driven through the operation of the motor, the housing including the sections 4 and 5 will be simultaneously rotated with the power shaft during the time the valve members 19' are in closed position. This connection operates the driven shaft 17 when any of the gears of the transmission are in an inoperative position or when the transmission gears are in neutral position. When it is desired to shift the gears in the transmission, the clutch pedal is moved to an inoperative position, and through this movement, sleeve 30 will be moved on shaft 17 inwardly toward the housing, simultaneously moving rods 28 against the arcuate faces 27 on bell cranks 25, rocking bell cranks 25 and pulling inwardly upon rods 24. This operation rotates the screw members 22 forcing the fluted valve rods 18' inwardly in sleeves 17' and unseating valves 19', allowing the oil within the housing and cylinders to circulate freely so that as the housing rotates, the pistons will move freely within the cylinders and rotate around crank pin 12 without imparting movement to the shaft 17 leaving shaft 17 standing idle until the shifting of the gears has been completed.

As soon as the clutch pedal is released, bell cranks 25 will be returned to their normal positions, as shown in Figure 3, through the medium of a coil spring 32 wound upon each one of the nipples 21 and connected to the arms 23'. As the screw members 22 are returned into the nipples 21, valves 19' will be seated through the tension of the springs mounted on the stems "a" thereof, thus cutting off the flow of fluid to the cylinders whereby the movement of the pistons therein will be retarded carrying the pistons with the cylinders and imparting rotative movement to shaft 17 through the medium of arms 13 and 13'.

Particular attention is directed to the operation of valve 19', wherein it will be noted that should any leakage occur, around the pistons, during the time that the housing is rotating with shaft 17 and the pistons move inwardly in the cylinders due to such leakage, a vacuum would be created in front of the piston, but in order to overcome such a vacuum, the tension of the springs on the stems of the valves 19' will permit these valves to open sufficiently to allow a flow of oil into the cylinders to fill this vacuum.

It will be noted that when this vacuum in the cylinder increases, pressure in the housing becomes more effective causing valve 19′ to open.

If it were not for the operation of valves 19′, it will be noted that should a leakage occur around the pistons and they move inwardly in the cylinders, a vacuum would be created in front of the pistons whereby when the shaft 17 was disconnected, the pistons would move outwardly in the cylinders in a quick jerking movement, but due to the fact that the valves 19′ will allow sufficient oil to pass by them to fill this vacuum, this sudden movement on the part of any of the pistons will be overcome.

One of the important features of this particular type of clutch is the fact that the operative parts thereof will be completely enclosed within a housing containing a lubricating fluid, so that the parts are at all times thoroughly lubricated and will quickly and readily operate through the movement of the clutch pedal for connecting the motor or power shaft 1 with the driven or transmission shaft 17.

It will be understood that while I have illustrated and described the use of three cylinders and three pistons for operating a fluid clutch constructed in accordance with my invention, any number of cylinders and pistons may be used equally as well.

I claim:

A fluid clutch comprising a drive shaft, a driven shaft, a housing carried by one of said shafts, fluid cylinders carried by said housing, pistons operating in the cylinders and having connection with the other shaft, valve members for controlling the flow of fluid to said cylinders, means for normally maintaining the valve members in a closed position, and causing the cylinders and pistons to move simultaneously, means for opening said valves including a screw member for each valve, a crank arm on each screw member, a rod connected with each crank arm, and means for imparting reciprocating movement to the rods for rotating the screws for moving each valve member.

In testimony that I claim the foregoing I have hereunto set my hand at Milwaukee, in the county of Milwaukee and State of Wisconsin.

JAMES A. WORDEN.